Patented Oct. 19, 1943

2,332,401

UNITED STATES PATENT OFFICE 2,332,401

SOFTENING RUBBER

Richard O. Roblin, Jr., Old Greenwich, Conn., assignor to American Cyanamid Company, New York, N. Y., a corporation of Maine No Drawing. Application March 21, 1941, Serial No. 384,552

8 Claims. (Cl. 260—761)

This invention relates to the treatment of rubber and more particularly to a method of treating rubber to obtain a product of increased softness or plasticity.

It is known to mill the crude rubber in the presence of oxygen, e. g., air. The milling causes a softening or breakdown of the rubber which facilitates the subsequent processing (calendering, tubing, etc.) of the rubber or compounded rubber.

It is an object of the present invention to provide a process for accelerating the rate of breakdown of unvulcanized rubber and for increasing its plasticity. It is a further object to provide an unvulcanized rubber of increased plasticity. It is an additional object to provide a new class of rubber plasticizing agents.

The foregoing objects may be accomplished in accordance with my invention by subjecting unvulcanized rubber to the action of a small amount of an S-alkyl (long chain) isothiourea hydrochloride, as by milling the rubber therewith for a short time. These compounds may be represented by the following general formula:

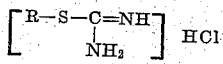

in which R is an aliphatic hydrocarbon group containing a straight chain of at least about 10 carbon atoms, such as decyl, lauryl, myristyl, palmityl, stearyl, oleyl, etc. The aliphatic chain may be branched or unbranched.

For maximum gain in plasticity, the plasticizing agent is added to the rubber as early as possible in the milling operation, such as just after the preliminary milling or knitting together of the rubber, and preferably in the absence of compounding ingredients, especially sulfur.

In general, the amount of plasticizing agent to be added will not be much above about 1% on the weight of the rubber, for example about 0.375%. Larger amounts may be used if desired but without proportionate increase in plasticizing effect. The plasticizing agents may be used singly, or more than one may be added to the rubber either separately or in admixture.

The plasticizing agents will be more effective at elevated temperatures, e. g. above about 50° C. Any temperature to which rubber may be heated without detrimental effect may be used, for example up to about 160° C.

My invention is further illustrated by the following specific example to which, however, the invention is not to be limited. The plasticizing effect of the agent on the rubber was determined in accordance with a modification of the well known Zimmerman and Cooper method, Ind. and Eng. Chem. 20, 812 (1928). The plasticity measurements were made in a Williams plastometer at 100° C. using a 3 minute "Y" value.

*Example*

A control of 420 grams of crude rubber (smoked sheets) was placed on a 12 inch mill, the rolls of which had an initial temperature of 80° C. After milling for 5 minutes, 20 grams of rubber (A) were removed and the remainder milled for a further 5 minutes (B).

A sample of 420 grams of smoked sheets was milled under the same conditions for 5 minutes when 20 grams of the rubber were removed (A). To the remainder of the rubber on the rolls was added 1.5 grams of a mixed (approximately 3.4% decyl, 59% lauryl, 22% myristyl, 11% palmityl, 4 stearyl) long chain isothiourea hydrochloride. This rubber was then milled for an additional 5 minutes (B).

The A and B rubber of both the control and the sample were cooled to room temperature before obtaining their "Y" values in the plastometer. The percentage softening of the rubber due to the action of the plasticizing agent was 10.8.

Rubber cements of low viscosity may be obtained by dissolving in a solvent the rubber which has been plasticized with a softening agent of the present invention.

Suitable variations and changes may be made in the invention without departing from the spirit thereof or the scope of the following claims.

I claim:

1. A process of increasing the plasticity of rubber which comprises, milling unvulcanized rubber with a small amount of a compound of the following general formula:

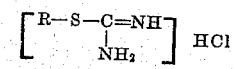

in which R is an aliphatic hydrocarbon radical from the group consisting of decyl, lauryl, myristyl, palmityl, stearyl and oleyl, for a time sufficient to effect an increase in the plasticity of the rubber over that which the rubber would have if subjected to the same conditions in the absence of said compound.

2. A process in accordance with claim 1, in which R is lauryl.

3. A process in accordance with claim 1, in which R is palmityl.

4. A process in accordance with claim 1, in which R is stearyl.

5. Unvulcanized rubber of increased plasticity obtained by melting the rubber with a small amount of a compound of the following general formula:

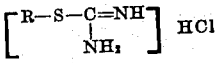

in which R is an aliphatic hydrocarbon radical selected from the group consisting of decyl, lauryl, myristyl, palmityl, stearyl and oleyl, for a time sufficient to effect an increase in the plasticity of the rubber over that which the rubber would have if subjected to the same conditions in the absence of said compound.

6. Unvulcanized rubber of increased plasticity obtained by milling the rubber with a small amount of S-lauryl isothiourea hydrochloride, for a time sufficient to effect an increase in plasticity of the rubber over that which the rubber would have if subjected to the same conditions in the absence of said isothiourea hydrochloride.

7. Unvulcanized rubber of increased plasticity obtained by milling the rubber with a small amount of S-palmityl isothiourea hydrochloride, for a time sufficient to effect an increase in the plasticity of the rubber over that which the rubber would have if subjected to the same conditions in the absence of said isothiourea hydrochloride.

8. Unvulcanized rubber of increased plasticity obtained by milling the rubber with a small amount of S-stearyl isothiourea hydrochloride, for a time sufficient to effect an increase in the plasticity of the rubber over that which the rubber would have if subjected to the same conditions in the absence of said isothiourea hydrochloride.

RICHARD O. ROBLIN, Jr.